(12) United States Patent
Ok et al.

(10) Patent No.: US 12,231,004 B2
(45) Date of Patent: Feb. 18, 2025

(54) ROTOR FOR AN ELECTRIC MOTOR AND ELECTRIC MOTOR

(71) Applicant: Brose Fahrzeugteile SE & Co. Kommanditgesellschaft, Würzburg, Würzburg (DE)

(72) Inventors: Saliba Ok, Würzburg (DE); Kevin Koch, Fürth (DE)

(73) Assignee: Brose Fahrzeugteile SE & Co. Kommanditgesellschaft, Würzburg (DE)

( * ) Notice: Subject to any disclaimer, the term of this patent is extended or adjusted under 35 U.S.C. 154(b) by 204 days.

(21) Appl. No.: 16/955,882

(22) PCT Filed: Dec. 20, 2018

(86) PCT No.: PCT/EP2018/086089
§ 371 (c)(1),
(2) Date: Mar. 4, 2021

(87) PCT Pub. No.: WO2019/122074
PCT Pub. Date: Jun. 27, 2019

(65) Prior Publication Data
US 2024/0154479 A1    May 9, 2024

(30) Foreign Application Priority Data
Dec. 21, 2017  (DE) .................... 10 2017 223 622.1

(51) Int. Cl.
*H02K 1/278* (2022.01)
*B62D 5/04* (2006.01)
(Continued)

(52) U.S. Cl.
CPC ........... *H02K 1/278* (2013.01); *B62D 5/0421* (2013.01); *H02K 1/30* (2013.01); *H02K 7/1166* (2013.01); *H02K 2201/06* (2013.01)

(58) Field of Classification Search
CPC ........ H02K 1/27; H02K 1/2753; H02K 1/274; H02K 1/272; H02K 1/2706; H02K 1/278;
(Continued)

(56) References Cited

U.S. PATENT DOCUMENTS 5,175,461 A * 12/1992 Zigler .................... H02K 15/03
                                                                310/156.28
5,828,152 A * 10/1998 Takeda ................... H02K 1/278
                                                                310/156.19
(Continued)

FOREIGN PATENT DOCUMENTS

| CN | 1659766 A | 8/2005 |
|----|-----------|--------|
| CN | 203632387 U | 6/2014 |

(Continued)

*Primary Examiner* — Edgardo San Martin
(74) *Attorney, Agent, or Firm* — Dickinson Wright PLLC (57) ABSTRACT

A rotor of an electric motor, in particular for a power steering system, including a rotor shaft, which is directed in an axial direction, and a number of rotor cores, which are arranged coaxial to each other along the rotor shaft, and an intermediate ring arranged between two rotor cores arranged adjacent to each other in the axial direction, which intermediate ring holds the adjacent rotor cores interlockingly in a crossed orientation relative to each other.

17 Claims, 9 Drawing Sheets

(51) Int. Cl.
  *H02K 1/27* (2022.01)
  *H02K 1/28* (2006.01)
  *H02K 1/30* (2006.01)
  *H02K 7/116* (2006.01)

(58) Field of Classification Search
  CPC .......... H02K 1/2783; H02K 1/28; H02K 1/30; H02K 7/1166; H02K 2201/06; H02K 2201/00; B62D 5/0421
  See application file for complete search history.

(56) References Cited

U.S. PATENT DOCUMENTS

| | | | | |
|---|---|---|---|---|
| 6,084,330 | A * | 7/2000 | Fisher | H02K 15/03 |
| | | | | 29/598 |
| 7,548,006 | B2 * | 6/2009 | Yu | H02K 1/2791 |
| | | | | 310/156.22 |
| 7,876,013 | B2 | 1/2011 | Okubo et al. | |
| 9,190,878 | B2 * | 11/2015 | Kottmyer | H02K 1/2791 |
| 9,712,008 | B2 * | 7/2017 | Ombach | H02K 29/03 |
| 10,439,459 | B2 * | 10/2019 | Udo | H02K 1/28 |
| 10,742,082 | B2 * | 8/2020 | Maki-Ontto | H02K 1/278 |
| 11,670,975 | B2 * | 6/2023 | Lee | H02K 1/28 |
| | | | | 310/156.01 |
| 2009/0001839 | A1 * | 1/2009 | Masayuki | H02K 29/08 |
| | | | | 310/156.16 |
| 2009/0309448 | A1 * | 12/2009 | Yang | H02K 1/2773 |
| | | | | 310/156.22 |
| 2010/0289367 | A1 * | 11/2010 | Lau | H02K 1/278 |
| | | | | 310/156.09 |
| 2013/0162090 | A1 | 6/2013 | Kwok et al. | |
| 2014/0042856 | A1 | 2/2014 | Miyashita et al. | |
| 2023/0031008 | A1 * | 2/2023 | Oh | H02K 1/278 |

FOREIGN PATENT DOCUMENTS

| | | | | |
|---|---|---|---|---|
| CN | 106877532 | A | | 6/2017 |
| DE | 60010537 | T2 | | 6/2005 |
| DE | 102013107269 | A1 | | 2/2014 |
| DE | 102016208692 | A1 | | 11/2017 |
| DE | 202017006978 | U1 * | | 3/2019 |
| EP | 1780870 | A1 | | 5/2007 |
| EP | 2395631 | A1 | | 12/2011 |
| EP | 3057204 | A1 | | 8/2016 |
| EP | 3208912 | A1 * | | 8/2017 |
| JP | 2001037122 | A * | | 2/2001 |
| JP | 2011067057 | A * | | 3/2011 |
| JP | 2013099038 | A * | | 5/2013 |
| JP | 2013102597 | A * | | 5/2013 ........... H02K 1/2773 |
| JP | 2014054047 | A * | | 3/2014 |

* cited by examiner

ROTOR FOR AN ELECTRIC MOTOR AND ELECTRIC MOTOR

CROSS-REFERENCE TO RELATED APPLICATIONS

This application is the U.S. National Phase of PCT/EP2018/086089 filed Dec. 20, 2018, which claims priority to German Patent Application No. DE 10 2017 223 622.1 filed Dec. 21, 2017, the disclosures of which are hereby incorporated in their entirety by reference herein.

TECHNICAL FIELD

The present disclosure relates to a rotor of an electric motor for use in a power steering system.

BACKGROUND

Nowadays, motor vehicles typically have a power steering system, which reduces a steering force that is required to actuate a steering wheel when steering at a standstill or in the case of low vehicle speeds. The power steering system assists a motor vehicle user when steering in that the steering force applied by the vehicle user is enhanced, for example by means of a hydraulic system or by means of an electric motor.

In an electromotive power steering system (EPS: electric power steering, EPAS: electric power assisted steering), the steering movements of the motor vehicle user are enhanced by and superimposed with an auxiliary force that is generated by an electric motor arranged on the mechanism of the steering wheel (steering column, steering gear). For such electromotive drives, so-called brushless electric motors (brushless direct-current motor, BLDC motor) are being used increasingly more frequently, in which the brushes of a rigid (mechanical) commutator, which are prone to wear, are replaced by electronic commutation of the motor current.

Such a brushless electric motor in the form of an electrical rotary current machine has in principle a fixed (stationary) stator having an electrical rotating-field winding with a number of (motor) phases. In the case of a brushless electric motor in the form of a three-phase rotary current machine, the stator, or the rotating-field winding thereof, has three phases and thus at least three phase conductors or phase windings, to each of which an electric current is applied, with a phase shift, in order to generate a magnetic rotating field in which a rotor, which is usually provided with permanent magnets and is also referred to as an armature, turns (rotates) about the axis thereof.

The rotor generally has an in particular cylindrical, punch-stacked (rotor) lamination packet as the central rotor packet. The rotor packet is, for example, fitted on and fixed to a rotor or motor shaft of the electric motor. The rotor packet has, for example, receivers into which the permanent magnets are pressed. Alternatively, it is likewise conceivable, for example, that the permanent magnets are fastened to or held on an outer circumference of a lateral surface of the rotor packet. For this purpose it is conceivable, for example, that the permanent magnets are joined to the lateral surface by material bonding, in particular by means of an adhesive or epoxide. Holding devices for fastening and/or holding the permanent magnets on the lateral surface without material bonding are likewise conceivable.

The rotor is arranged, for example, in a toothed stator having a number of radially directed stator teeth and stator slots. The rotating-field winding is in particular applied to the stator teeth. During operation of the electric motor, the magnetic resistance between the rotor and the stator is varied by a change of the air gap on switching from stator tooth to stator slot opposite the permanent magnets, whereby the force on the rotor is influenced. As a result, a so-called cogging torque is effected, which leads to fluctuating, jerky motor operation and thus to noise development.

SUMMARY

One or more objects of the present disclosure may be to provide a suitable rotor of an electric motor that may include a discretely offset rotor with improved mounting accuracy of the offset angle is to be produced. A further object underlying the invention is to provide an electric motor having such a rotor.

The rotor according to the invention is suitable and adapted for an electric motor, in particular for a power steering system of a motor vehicle. The rotor comprises a rotor shaft which is directed or runs in an axial direction and which carries a number of rotor packets fixed to the shaft. The rotor packets, which in particular are cylindrical, are preferably configured as punch-stacked lamination packets (rotor lamination packets) having a number of rotor laminations stacked or layered in the axial direction. The rotor packets are arranged or stacked along the rotor shaft coaxially with one another.

According to one or more embodiments, an intermediate ring (intermediate disk) is arranged between two rotor packets arranged adjacently in the axial direction, which intermediate ring holds the adjacent rotor packets in a form-fitting manner in an offset orientation relative to one another. In other words, the disk-shaped or annular intermediate ring is arranged, in the fitted state of the rotor, between the end faces of two immediately adjacent rotor packets. A particularly suitable rotor for an electric motor is thereby obtained.

A "form fit" or a "form-fitting mounting/connection" between at least two mutually connected parts is understood here, and in the following, as meaning in particular that the mutually connected parts are held together at least in one direction by a direct interengagement of contours of the parts themselves or by an indirect interengagement via an additional connecting part. A mutual movement in that direction is thus "blocked" as a result of the form.

This means that each of the adjacent rotor packets engages directly with the intermediate ring, that is to say the adjacent rotor packets are held in the offset position in a form-fitting manner indirectly by the intermediate ring. The form fit thereby takes place in particular in a tangential direction of the rotor, that is to say in a circumferential or azimuthal direction, so that a tangential rotation of the rotor packets relative to one another, which would lead to a deviation of a desired offset angle between the rotor packets, is blocked by the intermediate ring and thus prevented.

This means that the offset of the adjacent rotor packets is achieved by means of the intermediate ring. In other words, the adjacent rotor packets have, as a result of the intermediate ring, a defined offset angle, that is to say a tangential angular offset. On mounting of the rotor, the rotor packets are stacked and offset by means of the intermediate rings arranged between them. The offset (rotor) packet assembly is then fitted on and fixed to the rotor shaft, for example by means of a press-fit method.

Motors may include manufacturing and mounting inaccuracies during the mounting of the rotor, for example, the offset of the rotor packets may be inaccurate and may be improved by the use of an intermediate ring. As an example, mounting inaccuracies in the course of an offsetting on mechanical fitting of the rotor packets are avoided almost completely, since the angular accuracy of the desired offset angle depends substantially only on the component accuracy of the intermediate ring. The intermediate ring can be produced cost-effectively and simply with high component accuracy as a separate component. In other words, the tolerance and accuracy requirements in terms of the offset angle are transferred from a mounting installation to the intermediate ring. This brings about a substantial simplification in the mounting of rotors with axially stacked and mutually (discretely) offset rotor packets. Particularly simple and cost-effective mounting of the rotor is thereby achieved.

The intermediate ring is designed as an example according to a principle of interchangeable parts or a strategy of interchangeable parts. Particularly low tolerance fluctuations of the intermediate rings are thereby ensured. This may be advantageous for rotors having more than two rotor packets, in which multiple intermediate rings are introduced in succession or in a cascade in the assembly of rotor packets, whereby relatively low angular deviations of the successive offsets are achieved.

Furthermore, the clogging torque of the rotor is improved by the higher angular accuracy of the tangential offset angle between the rotor packets. In particular, torque ripples during operation of the rotor are thus reduced, which advantageously translates to the acoustic properties of the rotor.

In another embodiment, a number of permanent magnets are arranged distributed over the lateral surfaces of the approximately cylindrical rotor packets. The rotor packet may include an equilateral polygonal base area, so that the lateral surface has a number of equal-sized contact surfaces for the permanent magnets in a tangential or azimuthal direction, that is to say along the outer circumference. In other words, the rotor packets are equipped with surface magnets.

The permanent magnets of adjacent rotor packets are thereby seated (at the end face) tangentially in a form-fitting manner in the associated intermediate ring. This means that the permanent magnets are held or fastened on the lateral or contact surfaces of the rotor packets substantially without material bonding. As a result, in the assembly of rotor packets, a tangential and axial orientation and holding of the permanent magnets without material bonding is achieved.

Here and in the following, "material bonding" or a "material-bonded connection" between at least two mutually connected parts is understood as meaning in particular that the mutually connected parts are held together at their contact faces by material-based joining or crosslinking, for example on the basis of atomic or molecular binding forces, optionally under the action of an additive. Correspondingly, "without material bonding" refers to holding or fastening of the parts in the absence of such "material bonding" or a "material-bonded connection".

In another embodiment, a holding ring is provided on each of the end faces of the outermost rotor packets of the rotor, which holding ring secures the permanent magnets against undesirably slipping out axially. As a result, the permanent magnets are held against the lateral surfaces of the rotor packets in the radial and tangential direction without material bonding, in particular in a form-fitting manner. For the axial fixing of the permanent magnets it is provided in particular that the permanent magnets are enclosed axially between two successive intermediate rings or between an intermediate ring and one of the holding rings.

In particular, an axial form fit between the intermediate rings or an intermediate ring and a holding ring is accordingly achieved.

In contrast to the prior art, the geometry necessary for holding and/or fastening the permanent magnets is accordingly provided in particular on the intermediate rings, so that the rotor packets can have a shape that is geometrically particularly simple. In particular, the rotor packets do not have additional receivers or contours, or projections, on the lateral surface for holding or fastening the permanent magnets, so that the rotor laminations, and thus the respective rotor packets, can be produced particularly simply and cost-effectively. Furthermore, by arranging the permanent magnets on the lateral surface, the magnetic field lines of the permanent magnets within the respective rotor packet are not disturbed.

In one or more embodiments, the outer circumference of the intermediate ring is smaller than or equal to the outer circumference of the permanent magnets arranged on the lateral surfaces of the rotor packets. In other words, the outer circumference of the intermediate ring does not protrude radially beyond the outer circumference of the permanent magnets arranged on the lateral surfaces of the rotor packets. In particular, the outer circumferences of the intermediate ring and of the arranged permanent magnets are designed to be approximately in alignment with one another. As a result, a particularly uniform and simple outer contour of the rotor is ensured.

In one conceivable embodiment, the intermediate ring has a ring body which protrudes radially beyond the outer circumference of the rotor packets, that is to say the lateral surfaces, in a ring region. The ring region suitably has a radial ring width which corresponds approximately to the radial thickness of the permanent magnets. As a result, the permanent magnets of the rotor packets arranged adjacent to the intermediate ring are seated at least partly on the ring region. The ring region accordingly forms substantially an axial stop for the permanent magnets. In particular, an axial form fit for the permanent magnets is effected by the ring region, whereby the permanent magnets in the mounted or fitted state of the rotor are secured against undesirably slipping out axially.

As an example, the intermediate ring, in particular the ring region of the ring body, is provided with axially projecting holding contours on its axially opposite planar sides, that is to say the surfaces facing the end faces of the adjacent rotor packets. The holding contours effect form-fitting holding for ensuring the desired offset of the adjoining rotor packets.

The holding contours may be arranged distributed along the outer circumference of the ring body, or of the ring region, and adapted to the distribution measure or distribution pattern of the permanent magnets of the rotor packets. In the assembly of the rotor packets arranged along the rotor shaft, the opposing arrangement of two intermediate rings or of an intermediate ring and a holding ring at the end faces means that the holding and/or fastening of the permanent magnets is substantially independent of the axial dimensioning of the respective rotor packet. As a result, it is possible for the rotor packet to be produced with a particularly simple outer contour. This may reduce spaced required for production outlay and may reduce production costs.

In another embodiment, the holding contours of one planar side of the intermediate ring, or of the ring region, have a tangential offset, that is to say a tangential angular offset, relative to the holding contours of the other planar side of the intermediate ring. This means that the holding contours of one planar side are arranged twisted by the desired offset angle relative to the holding contours of the other planar side. As a result, a particularly suitable intermediate ring is achieved.

With respect to the holding contours, they may be configured as a number of holding projections which project axially from the planar sides and are arranged distributed tangentially in the ring region. The holding projections have a distribution measure adapted to the permanent magnets of the rotor packets, wherein the distribution measures on the planar sides of the intermediate ring are arranged rotated relative to one another by the offset angle. As a result, a relatively simple and material-saving intermediate ring is achieved.

In another embodiment, the holding projections may each have an approximately T-shaped cross-sectional form in the axial direction, wherein the vertical T-leg runs radially between two tangentially adjacent permanent magnets of a rotor packet, and wherein the horizontal T-leg covers the two adjacent permanent magnets tangentially in part. As a result, this may form the holding projections or the holding contours and at the same time allows the permanent magnets to be held particularly securely and reliably.

In another embodiment, the intermediate ring may be a plastic component, that may be produced as an injection-molded part from an electrically non-conductive plastics material. This is may be advantageous because the comparatively complex geometry for holding and/or fastening the permanent magnets is formed substantially only on the intermediate ring. Production by an injection-molding method allows the intermediate ring to be produced in a particularly simple and cost-effective manner. This may translate to a reduction in the production time and the production costs of the rotor.

The intermediate ring may be produced from a glass-fiber-reinforced plastics material, for example from a polyamide (PA), in particular PA 6.6 GF30, or from a polyphenylene sulfide (PPS), in particular PPS GF30, or a polyoxymethylene (POM), in particular POM GF30.

As an example the intermediate ring, or the ring body thereof, may include a number of radially internal, axially projecting fastening projections. By means of the fastening projections, the ring body, or the intermediate ring, is fastened to the rotor packets. As another example, the ring body of the intermediate ring has on a radially internal inner circumference of a central annular opening a number of radially inwardly protruding tooth projections at the radially internal tooth end of which the fastening projections are arranged. As an example, the fastening projections are formed on the respective tooth end in one piece, that is to say integrally or monolithically.

In a conceivable further development, the fastening projections are substantially pin-shaped and, in the mounted state, are inserted in apertures of the rotor packet. The apertures are in particular through-openings of the respective rotor packet, which are preferably introduced into the rotor packet in order to reduce the mass moment of inertia thereof. In other words, the rotor packets do not have any additional structures for fastening and/or holding the intermediate ring. Instead, the intermediate ring is fastened to the adjacent rotor packets by means of the already existing structures thereof. As a result, an advantageous functional integration of the rotor packet and of the intermediate ring is achieved.

The apertures have in the axial direction, for example, an approximately drop-shaped cross-sectional form, into which the fastening projections engage. Accordingly, form-fitting anti-twist protection or anti-twist prevention is provided for the intermediate ring on the rotor packets. In other words, the rotor packets are held in a twist-proof manner relative to one another by means of the intermediate ring. This effects in particular particularly secure and reliable fastening and/or holding of the permanent magnets on the lateral surfaces of the adjacent rotor packets.

In an alternative form, the apertures have, for example, a cross-shaped or semi-annular cross-sectional form. It is important that the fastening projections engage axially into the apertures of the rotor packet and accordingly holds the intermediate ring in a twist-proof manner on the adjoining rotor packets. In addition or alternatively, it is likewise conceivable that the apertures are configured with fastening contours for the fastening projections. In particular, a releasable snap-on or clip-type connection between the fastening projection and the respective aperture is thereby conceivable.

The rotor described above is part of an electric motor. The electric motor may be suitable and adapted for a power steering system of a motor vehicle. The electric motor may include a stator and a rotor shaft which is rotatably mounted relative thereto and on which the rotor packets of the rotor are carried fixed to the shaft. The rotor packets of the rotor are arranged along the rotor shaft offset relative to one another by means of intermediate rings. The electric motor may be a brushless electric motor in the manner of an internal armature.

When used for a power steering system, the electric motor is arranged in the region of a driver's cabin, wherein particularly smooth motor operation is ensured by the rotor according to the invention because a particularly high angular accuracy of the offset of the rotor packets is ensured. As a result, a noise development of the electric motor is advantageously and more simply reduced, which advantageously translates to the user comfort of the motor vehicle.

BRIEF DESCRIPTION OF THE DRAWINGS

Exemplary embodiments of the invention will be explained in greater detail hereinbelow with reference to a drawing, in which.

Mutually corresponding parts and sizes are always provided with the same reference numerals in all the figures.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Electric motors in the form of permanently excited electrical machines are hereby known, in which the permanent magnets are arranged in the axial direction or along the rotor shaft offset with respect to one another. This means that permanent magnets of the rotor that are arranged or stacked axially one above the other are arranged offset with respect to one another in a tangential direction (circumferential direction/azimuthal direction). Such an offset or offset arrangement of the permanent magnets has an advantageous effect on reducing the clogging torque and accordingly on reducing a torque ripple of the electric motor. This consequently advantageously translates to a reduction of the running noise during operation of the electric motor. In other words, a noise development is accordingly reduced, whereby the acoustic properties of the rotor and of the electric motor are in turn improved, which may be desirable when they are used close to a vehicle interior.

For simplified mounting of the rotor, a so-called discrete offset, for example, is possible, in which a number of rotor packets equipped with permanent magnets are arranged coaxially with one another along the rotor shaft and are offset relative to one another or with respect to one another. This means that the rotor packets are in each case stacked with a tangential angular offset in the axial direction. In other words, the rotor packets equipped with permanent magnets are offset or rotated relative to one another in the tangential direction by an offset angle. This means that a tangential offset angle is achieved in the axial direction or along the rotor shaft from rotor packet to rotor packet.

On mounting of the rotor, the offset angle is generated, for example, mechanically in the course of fitting and fixing the rotor packets on the shaft. The offset angles that are generated are subject to a large number of mounting influences, such as, for example, grippers, bands, mechanisms or measuring inaccuracies, so that mounting inaccuracies frequently occur, which lead to deviations of the desired offset angles between the rotor packets. The clogging torque of the rotor or of the electric motor is thereby disadvantageously increased, as a result of which greater noise development occurs during operation.

Figure 1:
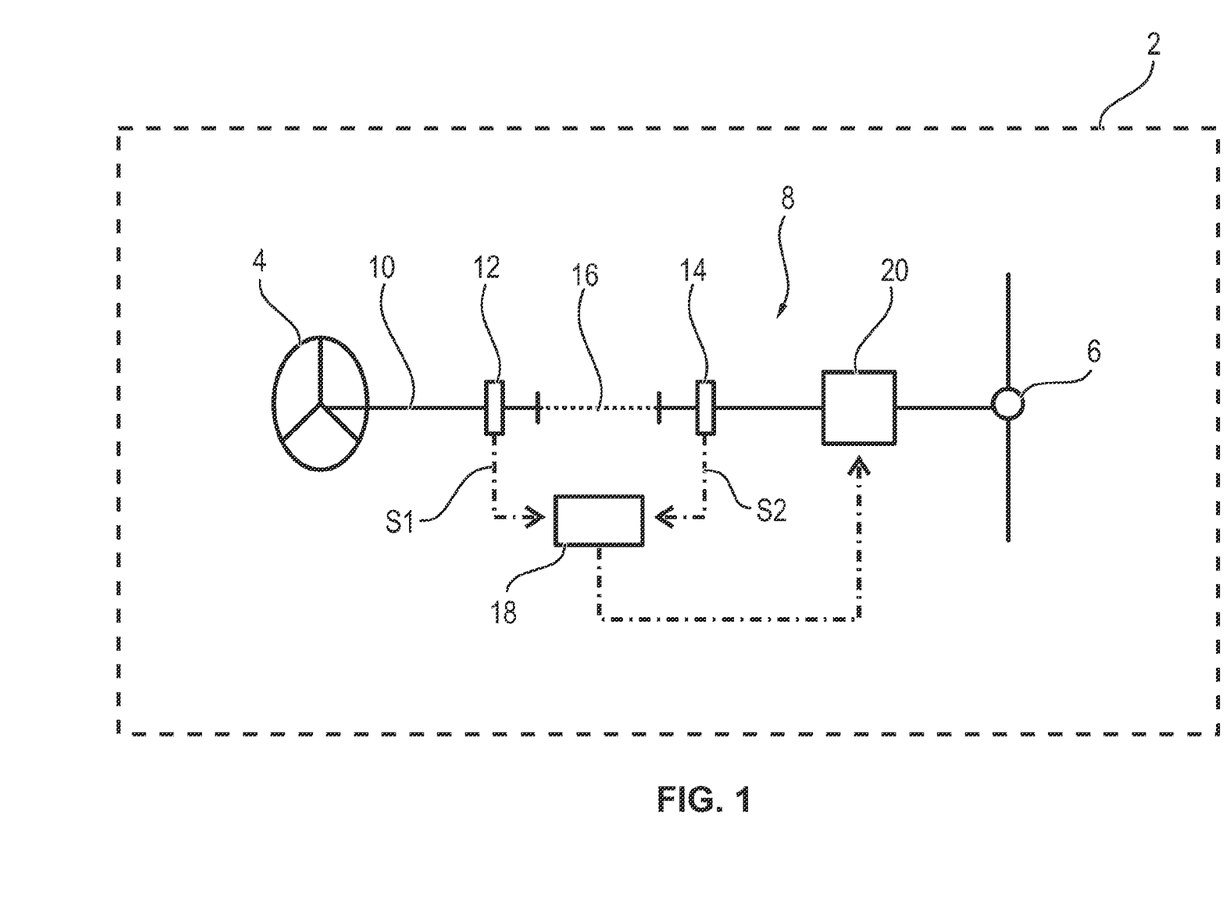
FIG. 1 is a schematic view of a motor vehicle having a power steering system with an electric motor.

FIG. 1 shows, in a schematic and simplified manner, a motor vehicle 2 having a steering wheel 4 and having a steering gear 6 coupled therewith for moving wheels, not illustrated in detail, of the motor vehicle 2. In order to reduce the required steering force, an electromotive power steering system 8 is provided between the steering wheel 4 and the steering gear 6.

The power steering system 8 is mechanically coupled on the one hand with a steering column 10, which is coupled with the steering wheel 4, and on the other hand with a steering gear 6. The power steering system 8 has two rotation sensors 12, 14 and a torsion bar 16 arranged between the rotation sensors 12 and 14. The rotation sensors 12, 14 are coupled in terms of signaling with a controller 18. The controller 18 is further guided in terms of signaling to an electric motor 20, which is coupled in terms of drive with the steering gear 6.

If a vehicle user turns the steering wheel 4 by means of a steering force, the steering column 10 is correspondingly turned or rotated. The torsion bar 16 is thereby deflected, which is detected by means of the rotation sensors 12 and 14. The rotation sensors 12 and 14 send corresponding measuring signals S1, S2 to the controller 18, which activates and/or regulates the electric motor 20 in dependence on the measuring signals S1, S2. The electric motor 20, during operation, generates in support of the steering force an auxiliary force acting in the same direction for moving the steering gear 6.

The structure of a rotor 22 of the electric motor 20 will be explained in greater detail hereinbelow with reference to FIG. 2 to FIG. 7.

Figure 2:
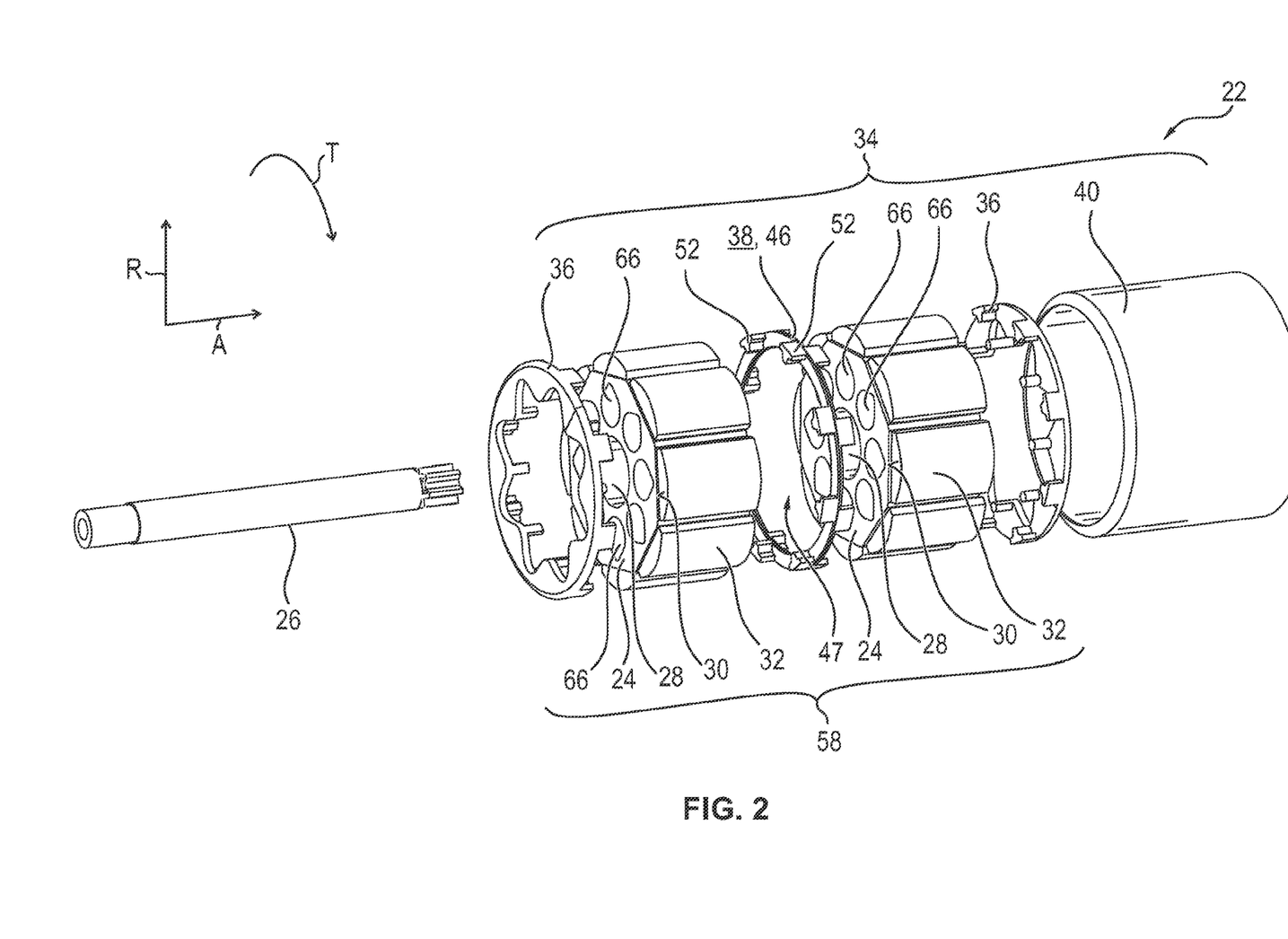
FIG. 2 is an exploded view of a rotor of the electric motor.

In FIG. 2, the rotor 22 of the electric motor 20 is shown in a partly disassembled state by means of an exploded view. The rotor 22 in this exemplary embodiment has two approximately cylindrical rotor packets 24 which are or can be fitted on and fixed to a rotor shaft 26. In the mounted state, the rotor shaft 26, and thus the rotor 22, are rotatably mounted relative to a fixed stator of the electric motor 20.

Figure 6:
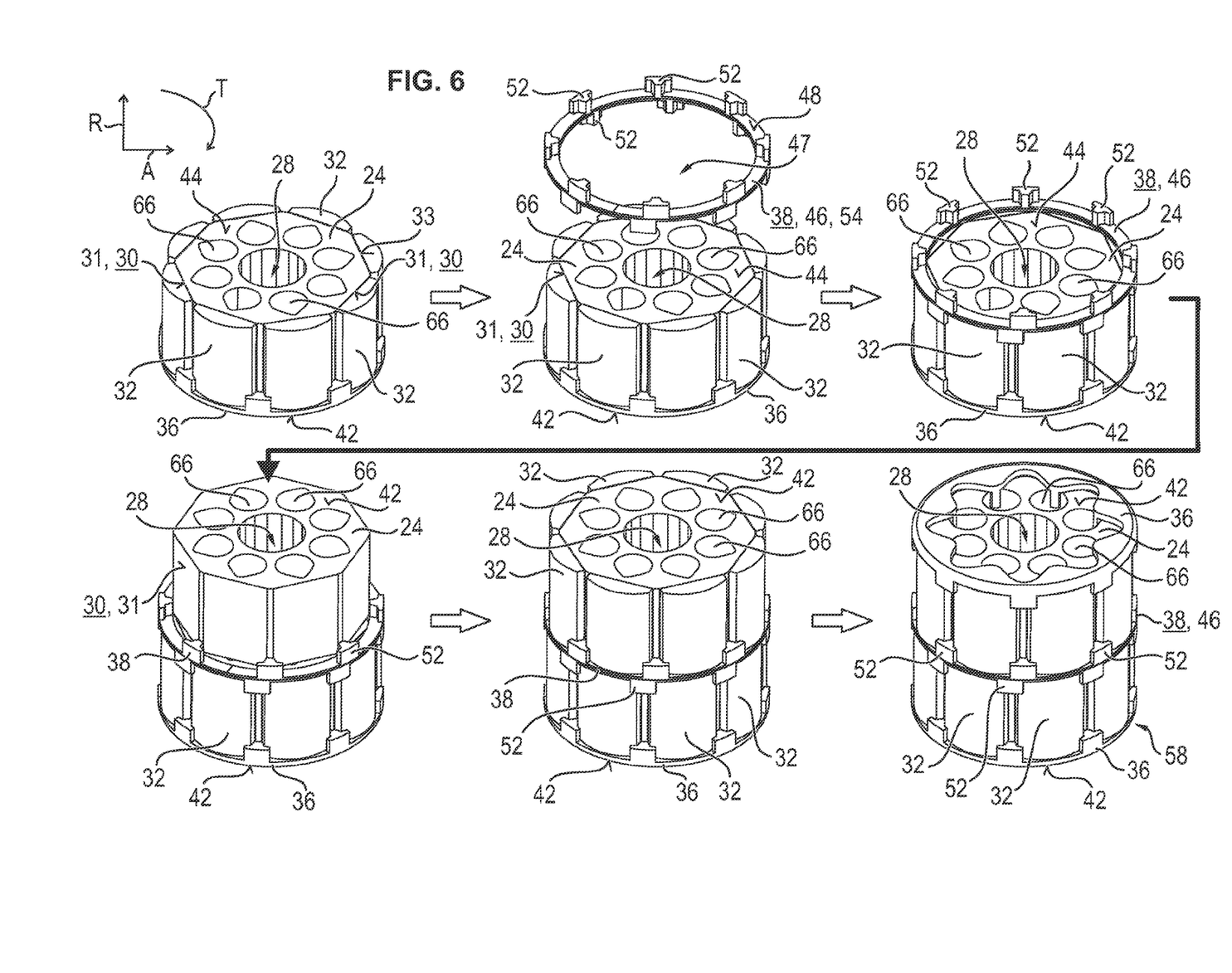
FIGS. 6 and 7 are successive perspective views of a mounting sequence of the rotor.

As is comparatively clearly visible in the exploded view of FIG. 2, the rotor packets 24 in this exemplary embodiment have an equilateral octagonal base area. Each rotor packet 24 is formed of a number of rotor laminations, not designated specifically, which are stacked and punch-stacked in an axial direction A to form a lamination packet (rotor lamination packet). The rotor packets 24 each have a central through-opening 28 for receiving the rotor shaft 26. The rotor packets 24 further each have a circumferential lateral surface 30 which extends, in the fitted state, in the axial direction A and which forms eight equal contact surfaces 31 corresponding to the base area (FIG. 6).

In this embodiment, the rotor packets 24 of the rotor 22 are each provided with eight permanent magnets 32 as surface magnets for generating a magnetic excitation field. The permanent magnets 32, which are provided with reference numerals only by way of example, are arranged distributed in a tangential direction T, that is to say in a circumferential or azimuthal direction of the rotor 22, on the outer circumference of the lateral surface 30 of the associated rotor packet 24.

The permanent magnets 32 each have in the axial direction A an approximately circle-segment-shaped cross-sectional form (FIG. 4), wherein the permanent magnets 32 are positioned along their respective chord on the associated contact surface 31 of the lateral surface 30 of the rotor packet 24 in question. In the mounted or fitted state of the rotor 22, the permanent magnets 32 are held and/or fastened on the lateral surfaces 10 of the rotor packets 24 without material bonding by means of a holding device 34. The holding device 34 has two holding or end rings 36 and an intermediate ring 38 and also a covering sleeve 40.

Figure 3:
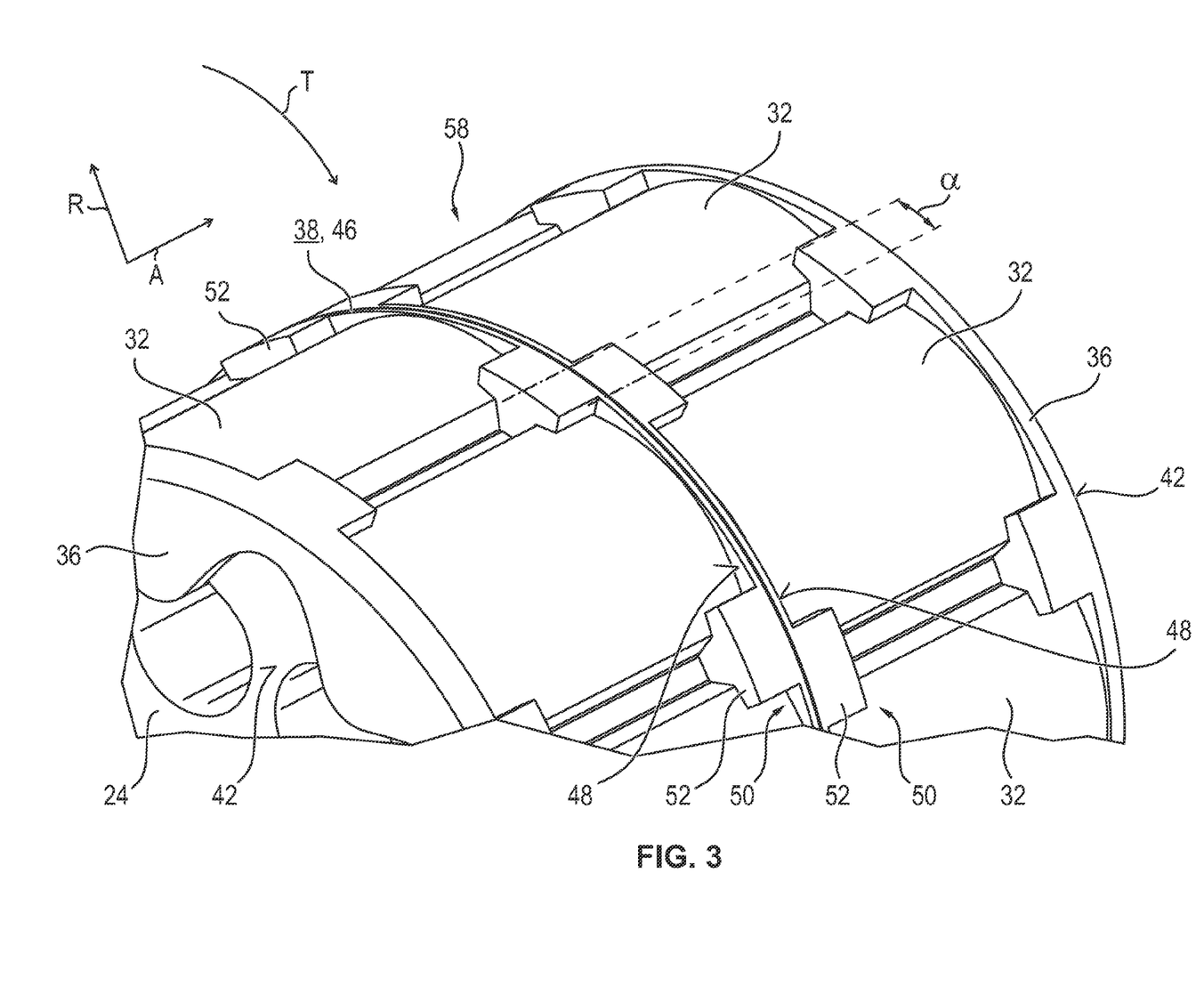
FIG. 3 is a perspective view of the rotor in a partly assembled state.

In FIG. 3, the rotor 22 is shown in part in a partially mounted state. As is comparatively clearly visible in the view of FIG. 3, the rotor packets 24 of the rotor 22 are arranged stacked one above the other coaxially in the axial direction A. The rotor packets 24 are further arranged offset relative to one another. This means that the rotor packets 24 are arranged rotated relative to one another in the tangential direction T. In other words, the rotor packets 24 have a tangential angular offset a, which is also referred to hereinbelow as the offset angle.

Figure 5:
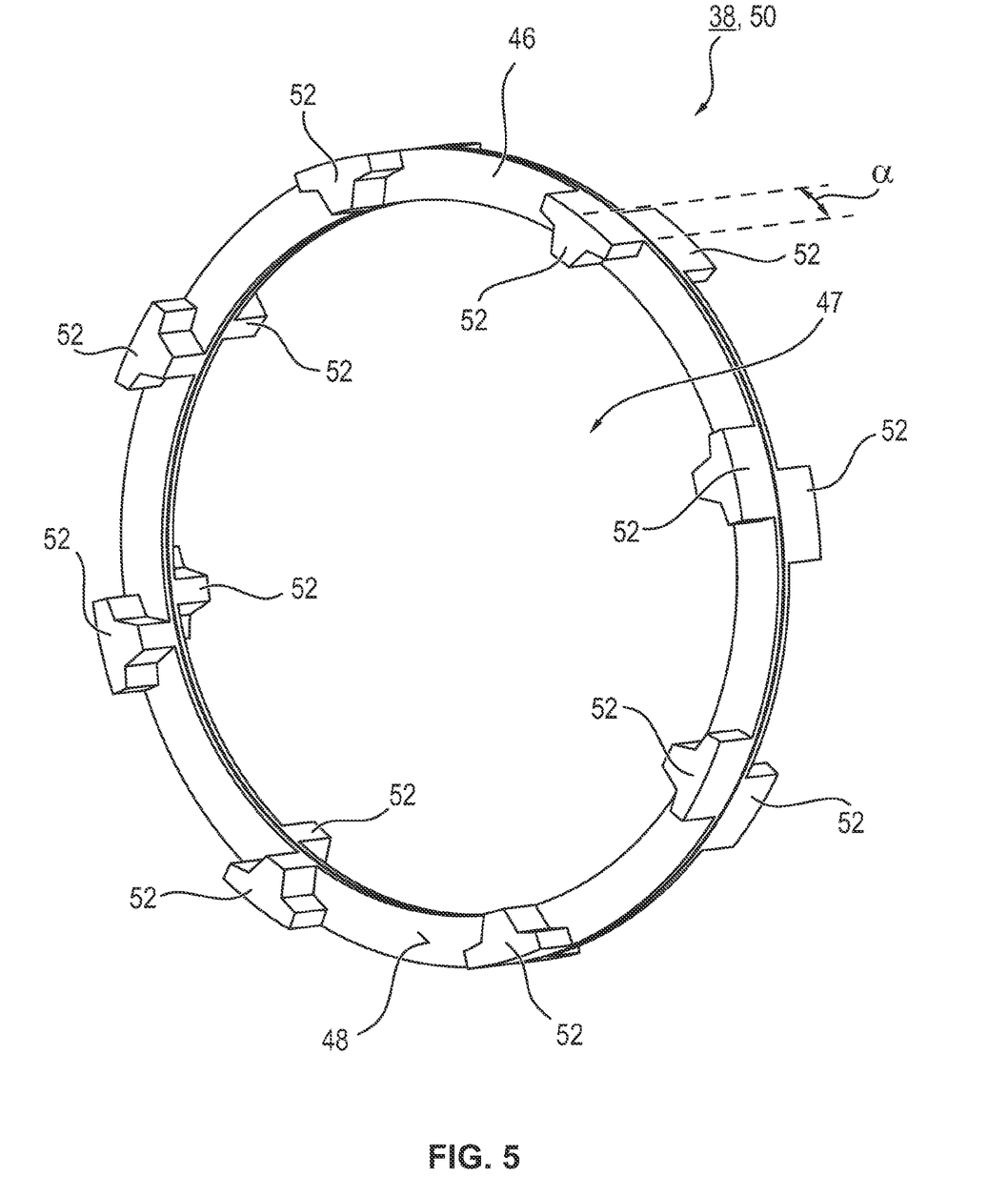
FIG. 5 is a perspective view of the intermediate ring.

As is comparatively clearly visible from FIG. 3, the holding rings 36 in the fitted or mounted state are seated on the outside end faces 42 of the juxtaposed rotor packets 24. On the end faces 44 opposite the end faces 42, that is to say on the end faces 44 that face one another (FIG. 5) of the rotor packets 24, the intermediate ring 38 shown on its own in FIG. 5 is arranged. In the mounted or fitted state, the rotor packets 24 are held in a form-fitting manner in an offset position relative to one another by means of the intermediate ring 38. This means that one rotor packet 24 has a tangential angular offset equal to the offset angle α relative to the other rotor packet 24.

The intermediate ring 38 has an annular ring body 46. A central annular opening 47 is introduced into the ring body 46 for the passage of the rotor shaft 26. On each of the planar sides 48 facing the rotor packets 24, the ring body 46 has a holding contour 50 with in each case eight fastening or holding projections 52. In other words, the ring body 46 has a number of holding projections 52 corresponding to the number of axially adjacent permanent magnets 32.

Figure 4:
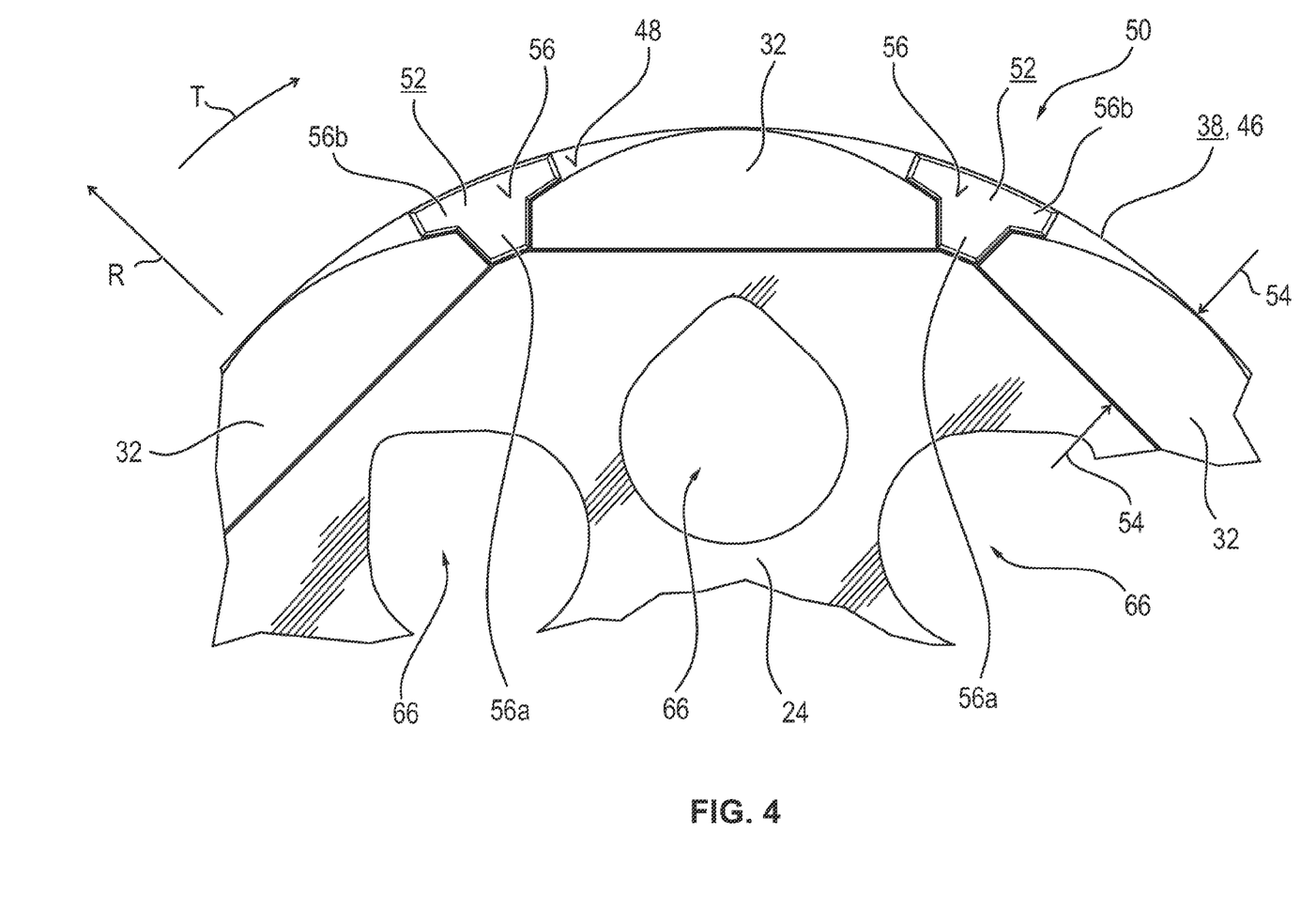
FIG. 4 is a sectional view of a rotor packet with an intermediate ring.

The holding contours 50 and the holding projections 52 are formed projecting from the planar sides 48 of the ring body 46. In other words, the holding projections 52, or the holding contours 50, protrude beyond the ring body 46 in the axial direction A. The holding contours 50, or the holding projections 52, are formed in one piece, that is to say integrally or monolithically, on the ring body 46. The holding contours 50 are arranged distributed uniformly along the outer circumference of the ring body 46 in a radially outer ring region 54 (FIG. 4, FIG. 5). The holding projections 52 of the holding contours 50 are provided with reference numerals in the figures only by way of example.

As is comparatively clearly visible in FIG. 4, the ring body 46 protrudes radially beyond the rotor packet 24 in its ring region 54. In other words, the ring region 54 of the ring body 46 of the intermediate ring 38 projects from the rotor packets 24 in a radial direction R. The ring region 54 has a radial width which corresponds to the thickness of the permanent magnets 32. In other words, the ring region 54 does not protrude in the radial direction R beyond the permanent magnets 32 arranged on the lateral surface 10 of the rotor packets 24.

The holding projections 52 have in the axial direction A an approximately trapezoidal, such as approximately T-shaped, cross-sectional form 56. The vertical T-legs 56a of the cross-sectional forms 56 are oriented in the radial direction R and are each arranged between two tangentially adjacent permanent magnets 32. The horizontal T-legs 56b are arranged running in the tangential direction T at the radially outer free ends of the T-legs 56a. The T-legs 56b are arranged substantially in alignment with the outer circumference of the ring region 54.

As is comparatively clearly visible in the plan view of FIG. 4, the T-legs 56a, 56b of the holding projections 52 lie against the radially external contour of the circle-segment-shaped permanent magnets 32 in such a manner that the permanent magnets 32 are enclosed tangentially and radially in those contact regions at least in part. This means that the permanent magnets 32 are held in the tangential direction T and the radial direction R in a form-fitting manner by means of the holding projections 52 of the holding contours 50. The permanent magnets 32 are further covered in the radial direction R at least in part by means of the ring region 54 at the end faces 44 of the rotor packets 24. Accordingly, the permanent magnets 32 are enclosed in a form-fitting manner by the intermediate ring 38 in the axial direction A.

The holding contours 50, or the holding projections 52, of the two planar sides 48 are arranged rotated relative to one another tangentially by the offset angle α—as is visible in particular in FIG. 3 and in FIG. 5. In other words, the distribution measure or distribution pattern of the holding contours 50 on the opposing planar sides 48 of the ring body 46 is arranged offset tangentially relative to one another by the offset angle α. As a result, the two rotor packets 24 in the fitted or mounted state of the rotor 22 are held offset relative to one another in a form-fitting, secure and reliable manner.

Accordingly, the holding contours 50 of one planar side 48 of the intermediate ring 38 have a tangential offset relative to the holding contours 50 of the other planar side 48 of the intermediate ring 38.

Figure 7:
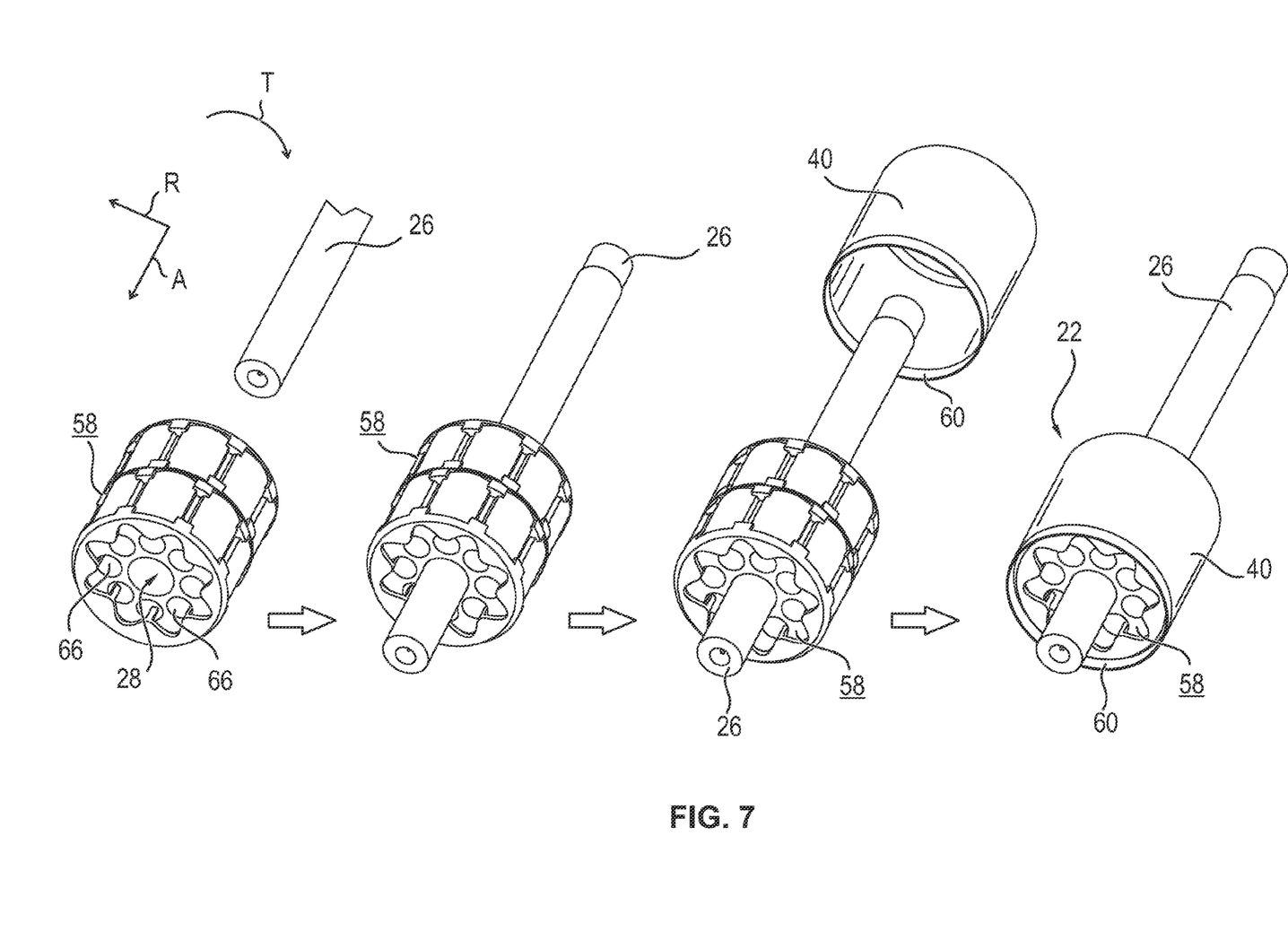

The mounting of the rotor 22 will be explained in greater detail hereinbelow with reference to FIG. 6 and FIG. 7. FIG. 6 shows the offsetting of the rotor packets 24 and the fastening of the permanent magnets 32 to the lateral surfaces 10 without material bonding. In FIG. 7, the fitting of the offset rotor packets 24 on the rotor shaft 26 and the application of the covering sleeve 40 are shown.

The top left representation of FIG. 6 shows the fitting of the first rotor packet 24 on one of the holding or end rings 36. The holding ring 36 arranged at the end face 42 has holding contours, not designated specifically, which are formed complementarily to the intermediate ring 38 and by means of which the permanent magnets 32 are arranged distributed tangentially on the lateral surface. Then—as is shown in the top middle representation of FIG. 6—the intermediate ring 38 is fitted to the end face 44 of the rotor packet 24. As is comparatively clearly visible in the top right representation of FIG. 6, the intermediate ring 38 is thereby rotated tangentially in such a manner that the holding contours 50 facing the end face 44 are oriented in axial alignment with the holding contours of the holding ring 36. As a result, the permanent magnets 32 of the rotor packet 24 are enclosed in a form-fitting manner between the holding ring 36 and the intermediate ring 38 and are fastened without material bonding and in a twist-proof manner to the contact surfaces 31 of the lateral surface 10.

The second rotor packet 24 is then fitted to the intermediate ring 38 (bottom left representation of FIG. 6), so that the through-openings 28 of the two rotor packets 24 are arranged in axial alignment one above the other. In other words, the rotor packets 24 are arranged coaxially with one another. The rotor packet 24 is thereby fitted offset with respect to the other rotor packet 24, according to the distribution measure of the intermediate ring 38. Next, the second rotor packet 24 is equipped with permanent magnets 32. As is visible in the bottom middle representation of FIG. 6, the intermediate ring 38 thereby acts analogously to the holding ring 36 of the first rotor packet 24 in the top left representation of FIG. 6. Owing to the offset arrangement of the holding contours 50, there is thus obtained an offset arrangement or distribution of the permanent magnets 32 of the first and second rotor packet 24. Finally, as is shown in the bottom right representation of FIG. 6, the second holding ring 36 is fitted to the end face 42 of the rotor packet 24, and the permanent magnets 32 are thus secured against undesirably slipping out axially. As a result, the permanent magnets 32 of the second rotor packet 24 are also enclosed in a form-fitting manner between the holding ring 36 and the intermediate ring 38 and are fastened without material bonding and in a twist-proof manner to the contact surfaces 31 of the lateral surface 10.

The packet assembly 58 of the rotor packets 24 assembled by means of the holding rings 36 and the intermediate ring 38 is then fitted on and fixed to the rotor shaft 26—for example by means of a press-fit (first and second representation of FIG. 7). For this purpose, the rotor shaft 26 is such as pressed with a force-fit into the through-openings 28 of the rotor packets 24.

Here and in the following, "force-fit" or "force-fit connection" between at least two mutually connected parts is understood as meaning that the mutually connected parts are prevented from sliding against one another by a frictional force acting between them. In the absence of a "connecting force" that causes this frictional force, that is to say the force that presses the parts against one another, the force-fit connection cannot be maintained and can thus be released.

The approximately hollow-cylindrical covering sleeve 40 is in the form of a deep-drawn (stainless) steel part or aluminum part. The covering sleeve 40 as a magnet covering fitted axially to the packet assembly 58, and thus to the permanent magnets 32 (third and fourth representations of FIG. 7). Fitting may be carried out by means of an axial press-fit (FIG. 7, right-hand side). It is thereby possible, for example, that only the permanent magnets 32 are in mechanical (touching) contact with the covering sleeve 40. In other words, the press-fit for fastening the covering sleeve 40 takes place only by means of the permanent magnets 32. As a result, the mechanical demands in terms of stability and strength of the holding rings 36 and of the intermediate ring 38 are advantageously and simply reduced. As an example, it is thus possible for the holding rings 36 and the intermediate ring 38 to be in the form of simple injection-molded parts of plastics material.

The covering sleeve 40 has a certain oversize in the axial direction A in respect of the axial height of the packet assembly 58. This means that the covering sleeve 40 has two end collar regions (end faces) 60, which are bent radially inwards in a method step following the press-fitting. This means that the covering sleeve 40 clasps the packet assembly 58 and thus the two offset rotor packets 24 in a form-fitting manner in the mounted state.

In one conceivable embodiment it is possible, for example, that the permanent magnets 32 are unmagnetized during mounting of the rotor 22. For this purpose, the permanent magnets 32 are produced, for example, from an unmagnetized ferromagnetic material. The permanent magnets 32 are arranged in the unmagnetized state on the rotor packets 24 and are not magnetized until the rotor 22 has been mounted. For this purpose, the covering sleeve 40 is suitably in magnetically transparent form. This means that the passage of magnetic field lines through the material of the covering sleeve 40 is not substantially influenced. For magnetization of the mounted, offset rotor 22, the rotor 22 is introduced in part into a magnetization field so that first of all the permanent magnets 22 of one rotor packet 24 are magnetized and then the permanent magnets 22 of the other rotor packet 24 are magnetized.

Figure 8:
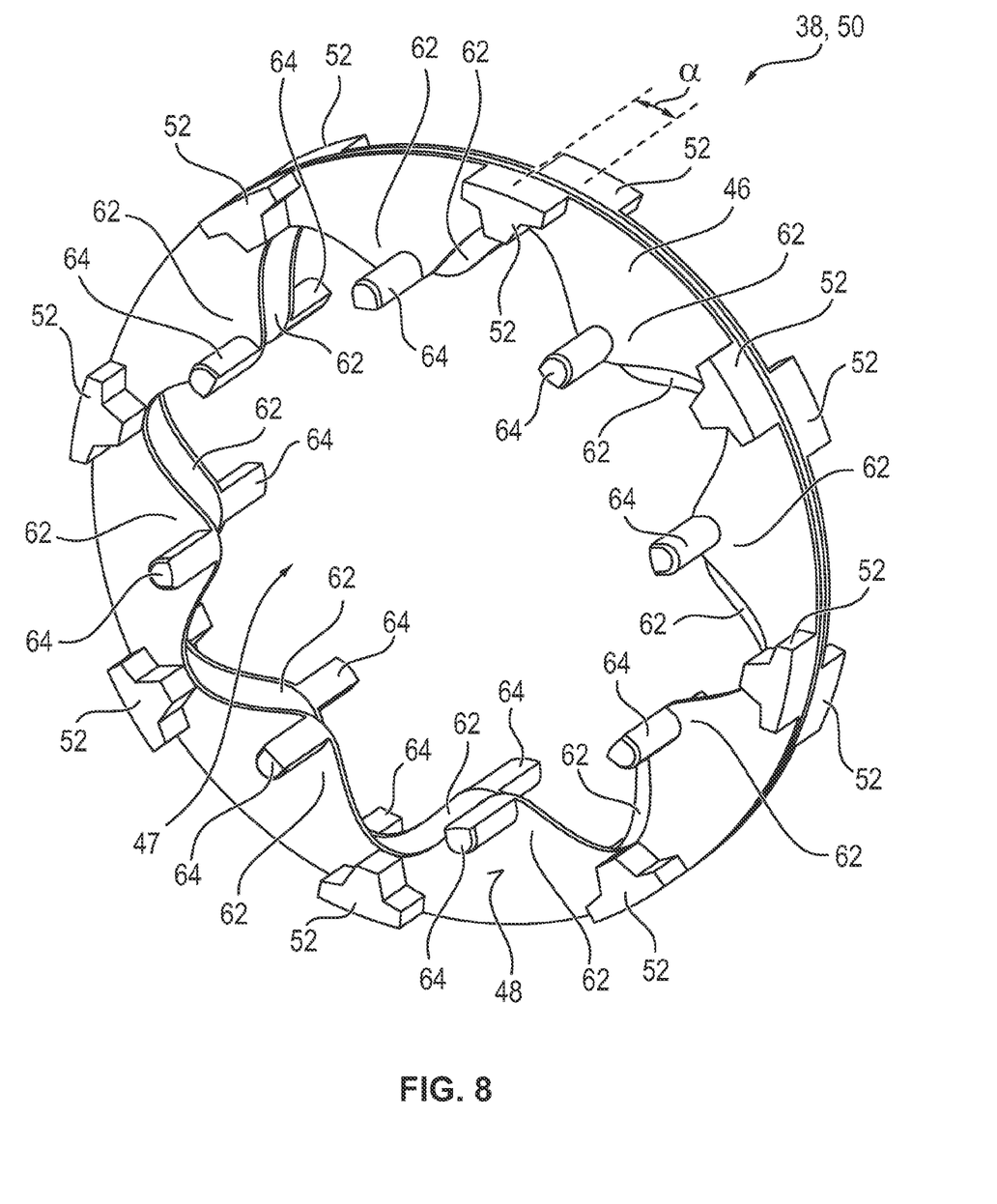
FIG. 8 is a perspective view of the intermediate ring in a second embodiment.
Figure 9:
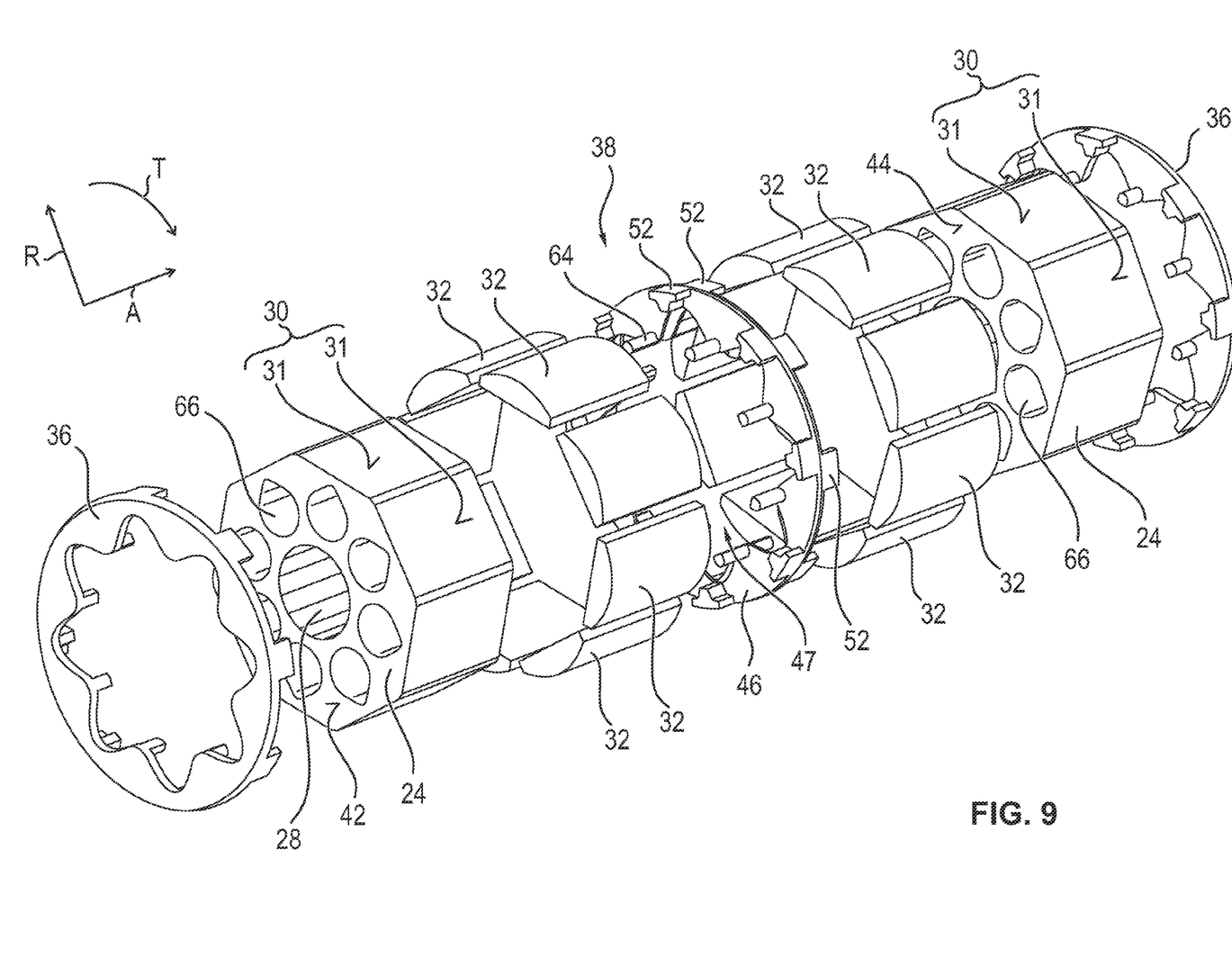
FIG. 9 is an exploded view of part of the rotor with the intermediate ring according to FIG. 8.

A second exemplary embodiment of the intermediate ring 38 will be explained in greater detail hereinbelow with reference to FIG. 8 and FIG. 9.

The radially internal inner circumference 28 of the ring body 24 in a radial direction R, that is to say the inner wall 28 of the annular opening 26, has in the exemplary embodiments shown. The star-shaped cross-sectional form of the inner wall 28 is thereby formed by ten radially inwardly projecting tooth projections 30 of the ring body 24.

In this embodiment, the annular opening 47 of the ring body 46 of the intermediate ring 38 has an approximately star-shaped cross-sectional form or inner contour. The star-shaped cross-sectional form of the annular opening 47 is thereby formed substantially by a number of tooth projections 62. The tooth projections 62 thereby project radially into the annular opening 47. The tooth projections 62 are each arranged between two holding projections 52 of a planar side 48. The in each case eight tooth projections 62 of the opposing planar sides 48 accordingly likewise have a tangential angular offset a. As a result, the tooth projections 62 of the opposing planar sides 48 overlap at least in part.

In this embodiment, the intermediate ring 38 further has, for each planar side 48, eight axially projecting fastening projections 64, which are formed in one piece, that is to say monolithically or integrally, at a radially internal tooth end of the tooth projections 62, that is to say at their radially internal free ends. Accordingly, the number of fastening projections 64, or the number of tooth projections 62, corresponds substantially to the number of holding projections 52.

The rotor packets 24 each have eight apertures 66 passing through the lamination packet in question, for reducing the mass moment of inertia of the rotor 22. The apertures 66 are arranged distributed uniformly around the central through-opening 28 in the tangential direction T. The apertures 66 are provided with reference numerals in the figures only by way of example.

As is visible in particular in FIG. 4, the apertures 38 have an approximately drop-shaped cross-sectional form in the axial direction A. In the mounted state, the fastening projections 64 of the intermediate ring 38 engage into the apertures 66 of the respective facing rotor packet 24. The drop shape of the apertures 66 acts in the manner of a centering aid on fitting of the intermediate ring 38 on the rotor packets 24. This means that the intermediate ring 38 engages axially into the adjacent rotor packets 24 at least in part by means of the fastening projections 64. As a result, a particularly stable and twist-proof offset of the rotor packets 24 is ensured.

The invention is not limited to the exemplary embodiments described above. Indeed, other variants of the invention can be derived therefrom by the person skilled in the art without departing from the subject-matter of the invention. In particular, all the individual features described in connection with the exemplary embodiments can further also be combined with one another in a different way, without departing from the subject-matter of the invention.

As another example, rotors 22 with more than two offset rotor packets 24 are also conceivable, wherein preferably a corresponding intermediate ring 38 is provided in each case between two axially adjacent rotor packets 24.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE SIGNS 2 motor vehicle
4 steering wheel
6 steering gear
8 power steering system
10 steering column
12, 14 rotation sensor
16 torsion bar
18 controller
20 electric motor
22 rotor
24 rotor packet
26 rotor shaft
28 through-opening
30 lateral surface
31 contact surface
32 permanent magnet
34 holding device
36 holding ring/end ring
38 intermediate ring 40 covering sleeve
42 end face
44 end face
46 ring body
47 annular opening
48 planar side
50 holding contour
52 holding projection
54 ring region
56 cross-sectional form
56a, 56b T-leg
58 packet assembly
60 collar region
62 tooth projection
64 fastening projection
66 aperture
S1, S2 measuring signal
A axial direction
T tangential direction
R radial direction While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A rotor for an electric motor for use in a power steering system, the rotor comprising:
    a rotor shaft extending in an axial direction;
    a number of rotor packets arranged coaxially with one another along the rotor shaft; and
    an intermediate ring disposed between two rotor packets of the number of rotor packets arranged adjacent to one another and configured to hold the two rotor packets in a form-fitting manner in an offset orientation relative to one another,
    wherein the intermediate ring includes a ring body, wherein the ring body includes a number of fastening projections axially projecting from an inner periphery of the ring body and configured to fasten to the adjacent rotor packets, wherein the ring body defines a central opening, forming the inner periphery, wherein the ring body includes a number of tooth projections each extending radially inward from the ring body, and wherein a fastening projection of the number of fastening projections extends from a tooth projection of the number of tooth projections.

2. The rotor of claim 1, further comprising:
    a number of permanent magnets disposed on a number of lateral surfaces defined by the number of rotor packets wherein a permanent magnet of the number of permanent magnets engages the intermediate ring to form a force fit connection.

3. The rotor of claim 2, wherein an outer circumference of the intermediate ring is less than or equal to an outer circumference of the permanent magnets.

4. The rotor of claim 3, wherein the ring body includes a ring region protruding radially beyond an outer circumference of the rotor packets.

5. The rotor of claim 4, wherein the ring body includes a first planar side and a second planar side, opposing the first planar side, and a number of holding contours axially extending from the first planar side and the second planar side.

6. The rotor of claim 5, wherein a first holding contour of the number of contours extends from the first planar side is circumferentially offset relative to a second holding contour extending from the second planar side.

7. The rotor of claim 6, wherein the number of holding contours are formed by a number of axially projecting holding projections arranged circumferentially about the ring body and wherein a first axially projecting holding portion of the number of axially projecting holding projections is disposed within the ring region.

8. The rotor of claim 7, wherein each of the number of axially projecting holding projections have an approximately T-shaped cross-section with respect to the axial direction, wherein a vertical T-leg of the T-shaped cross-section extends radially between two adjacent permanent magnets of the number of permanent magnets, and wherein a horizontal T-leg circumferentially covers at least a portion of each of the two adjacent permanent magnets.

9. An electric motor for use in a power steering system, the electric motor comprising:
    a stator; and
    a rotor configured to rotate about the stator and including,
    a rotor shaft extending in an axial direction,
    a number of rotor packets arranged coaxially with one another along the rotor shaft, and
    an intermediate ring disposed between two rotor packets of the number of rotor packets arranged adjacent to one another and configured to hold the two rotor packets in a form-fitting manner in an offset orientation relative to one another,
    wherein the intermediate ring includes a ring body, wherein the ring body includes a number of fastening projections axially projecting from an inner periphery of the ring body and configured to fasten to the adjacent rotor packets, wherein the ring body defines a central opening, forming the inner periphery, wherein the ring body includes a number of tooth projections each extending radially inward from the ring body, and wherein a fastening projection of the number of fastening projections extends from a tooth projection of the number of tooth projections.

10. An electric motor for use in a power steering system, the electric motor comprising:
    a rotor shaft extending in an axial direction;
    a first rotor packet disposed on the rotor shaft and including a first number of permanent magnets;
    a second rotor packet disposed on the rotor shaft and including a second number of permanent magnets; and
    an intermediate ring disposed between the first rotor packet and the second rotor packet and including,
    a first holding projection extending along the axial direction towards a first end of the first rotor packet and disposed between two adjacent permanent magnets of the first number of permanent magnets,
    a second holding projection extending along the axial direction towards a first end of the second rotor packet and disposed between two adjacent permanent magnets of the second number of permanent magnets, wherein the first holding projection and the second holding projection are circumferentially offset from one another, and
    a ring body, wherein the ring body includes a number of fastening projections axially projecting from an inner periphery of the ring body and configured to fasten to adjacent rotor packets, wherein the ring body defines a central opening, forming the inner periphery, wherein the ring body includes a number of tooth projections each extending radially inward from the ring body, and wherein a fastening projection of the number of fastening projections extends from a tooth projection of the number of tooth projections.

11. The electric motor of claim 10, wherein the first holding projection and the adjacent permanent magnets of the first number of permanent magnets form a force fit condition.

12. The electric motor of claim 10, wherein an outer circumference of the intermediate ring is less than or equal to an outer circumference of the permanent magnets.

13. The electric motor of claim 10, wherein the ring body includes a ring region protruding radially beyond an outer circumference of the first rotor packet.

14. The electric motor of claim 10, wherein the first holding projection has a T-shaped cross-section.

15. The electric motor of claim 14, wherein a vertical leg of the T-shaped cross-section is disposed between the adjacent permanent magnets of the first number of permanent magnets.

16. The electric motor of claim 15, wherein a horizontal leg of the T-shaped cross-section lies along an outer circumference of the adjacent permanent magnets of the first number of permanent magnets.

17. The electric motor of claim 10, wherein the number of fastening projections have a semi-circular cross-section.

* * * * *